United States Patent
Mukaiyama

(10) Patent No.: US 11,138,818 B2
(45) Date of Patent: Oct. 5, 2021

(54) ELECTRONIC KEY SYSTEM AND ELECTRONIC KEY MANAGING APPARATUS

(71) Applicant: TOYOTA JIDOSHA KABUSHIKI KAISHA, Toyota (JP)

(72) Inventor: Yoshio Mukaiyama, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/245,536

(22) Filed: Jan. 11, 2019

(65) Prior Publication Data
US 2019/0221061 A1 Jul. 18, 2019

(30) Foreign Application Priority Data
Jan. 16, 2018 (JP) .............................. JP2018-005062

(51) Int. Cl.
*G07C 9/00* (2020.01)
*G07B 15/02* (2011.01)

(52) U.S. Cl.
CPC ......... *G07C 9/00309* (2013.01); *G07B 15/02* (2013.01); *G07C 9/00571* (2013.01); *G07C 9/00896* (2013.01); *G07C 2009/00396* (2013.01); *G07C 2009/00476* (2013.01); *G07C 2009/00769* (2013.01)

(58) Field of Classification Search
CPC ............ G07C 9/00309; G07C 9/00896; G07C 2009/00396; G07C 2009/00476; G07C 2009/00769
See application file for complete search history.

(56) References Cited

U.S. PATENT DOCUMENTS

| | | | |
|---|---|---|---|
| 2009/0309696 A1* | 12/2009 | Tsuruta | G07C 9/00309 340/5.22 |
| 2013/0301829 A1* | 11/2013 | Kawamura | H04L 9/0869 380/44 |
| 2015/0113280 A1* | 4/2015 | Maruyama | H04L 63/0428 713/171 |
| 2015/0161832 A1* | 6/2015 | Esselink | B60R 25/24 340/5.22 |

(Continued)

FOREIGN PATENT DOCUMENTS

| | | |
|---|---|---|
| JP | 2004-360222 A | 12/2004 |
| JP | 2008-196258 A | 8/2008 |
| JP | 2009-269542 A | 11/2009 |

(Continued)

*Primary Examiner* — Thomas D Alunkal
(74) *Attorney, Agent, or Firm* — Sughrue Mion, PLLC

(57) ABSTRACT

An electronic key system is provided with: an electronic key issuing apparatus configured to issue an electronic key associated with a moving body; a determinator configured to determine whether or not an electronic key with a first key code as the electronic key is normal; and a requester configured to request the electronic key issuing apparatus to reissue the electronic key on condition that it is determined by the determinator that the electronic key with the first key code is not normal. The electronic key issuing apparatus is configured to issue an electronic key with a second key code, which is different from the first key code, as the electronic key, on condition that the electronic key issuing apparatus is requested to reissue the electronic key.

9 Claims, 5 Drawing Sheets

(56) References Cited

U.S. PATENT DOCUMENTS

2016/0098876 A1* 4/2016 Oz ........................ H04W 4/023
340/5.61
2017/0249791 A1* 8/2017 Woo ................... G07C 9/00309

FOREIGN PATENT DOCUMENTS

| JP | 2010-126949 A | 6/2010 |
| JP | 2014-240586 A | 12/2014 |

* cited by examiner

ELECTRONIC KEY SYSTEM AND ELECTRONIC KEY MANAGING APPARATUS

CROSS-REFERENCE TO RELATED APPLICATIONS

This application is based upon and claims the benefit of priority of the prior Japanese Patent Application No. 2018-005062, filed on Jan. 16, 2018, the entire contents of which are incorporated herein by reference.

BACKGROUND

1. Technical Field

Embodiments of the present disclosure relate to an electronic key system and an electronic key managing apparatus.

2. Description of the Related Art

For this type of system, for example, there is proposed a system configured to open a door lock of a vehicle by using a mobile phone in which key information is stored (refer to Japanese Patent Application Laid Open No. 2010-126949 (Patent Literature 1)). In a technology/technique disclosed in the Patent Literature 1, the key information is transmitted from a mobile phone A, which functions as a master key of an electronic key, to a mobile phone B, which functions as an electronic duplicate key. Alternatively, there is proposed a system that is provided with: a vehicle including therein a lock mechanism; a mobile phone configured to release the lock mechanism by inputting an electronic key to the lock mechanism; and a server configured to distribute the electronic key to the lock mechanism and the mobile phone (refer to Japanese Patent Application Laid Open No. 2004-360222 (Patent Literature 2)).

The electronic key has a problem in which data may be lost or stolen due to data falsification by a malicious third person or the like, wherein the data is an entity of the electronic key. Moreover, the electronic key also has a problem in which the data as the entity of the electronic key may be lost due to a failure of a recording medium on which the electronic key is stored. Those problems are not considered in the technologies/techniques disclosed in the Patent Literatures 1 and 2.

SUMMARY

In view of the aforementioned problems, it is therefore an object of embodiments of the present disclosure to provide an electronic key system and an electronic key managing apparatus in which an electronic key can be normalized if an abnormality occurs in the electronic key.

The above object of embodiments of the present disclosure can be achieved by an electronic key system provided with: an electronic key issuing apparatus configured to issue an electronic key associated with a moving body; a determinator configured to determine whether or not an electronic key with a first key code as the electronic key, which is issued by the electronic key issuing apparatus, is normal; and a requester configured to request the electronic key issuing apparatus to reissue the electronic key on condition that it is determined by the determinator that the electronic key with the first key code is not normal, wherein the electronic key issuing apparatus is configured to issue an electronic key with a second key code, which is different from the first key code, as the electronic key, on condition that the electronic key issuing apparatus is requested to reissue the electronic key.

The above object of embodiments of the present disclosure can be also achieved by an electronic key managing apparatus provided with: a storage configured to store therein an electronic key associated with a moving body; a determinator configured to determine whether or not an electronic key with a first key code as the electronic key is normal; and a requester configured to request an electronic key issuing apparatus, which is configured to issue the electronic key, to reissue an electronic key with a second key code, which is different from the first key code, as the electronic key, on condition that it is determined by said determinator that the electronic key with the first key code is not normal.

DETAILED DESCRIPTION OF THE EMBODIMENTS

An electronic key system according to an embodiment will be explained with reference to FIG. 1 to FIG. 6. In the following embodiment, an example of a place in which the electronic key system is applied is a parking lot. An "electronic key" according to the embodiment may mean a virtual key, which is, for example, an encoded code or the like. Hereinafter, the "electronic key" according to the embodiment will be referred to as the "virtual key", as occasion demands.

(Configuration)

Figure 1:
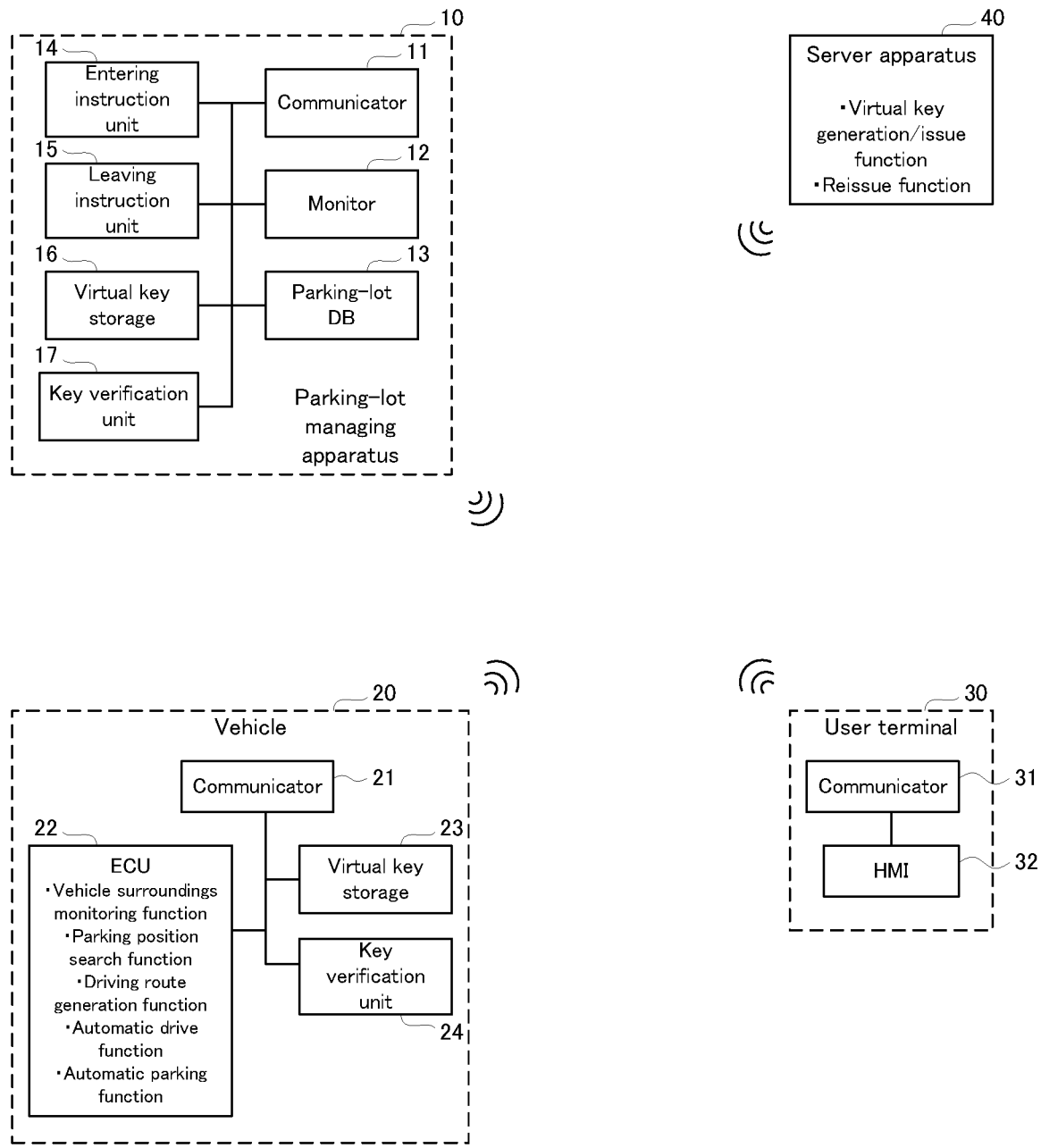
FIG. 1 is a block diagram illustrating a configuration of an electronic key system according to an embodiment.

Firstly, a configuration of the electronic key system according to the embodiment will be explained with reference to FIG. 1. FIG. 1 is a block diagram illustrating the configuration of the electronic key system according to the embodiment.

In FIG. 1, an electronic key system 1 is provided with a parking-lot managing apparatus 10, a vehicle 20, a user terminal 30, and a server apparatus 40. The parking-lot managing apparatus 10, the vehicle 20, the user terminal 30, and the server apparatus 40 are configured to communicate with each other.

The parking-lot managing apparatus 10 is provided with a communicator 11, a monitor 12, a parking-lot database 13, an entering instruction unit 14, a leaving instruction unit 15, a virtual key storage 16, and a key verification unit 17. The vehicle 20 is provided with a communicator 21, an electronic control unit (ECU) 22, a virtual key storage 23, and a key verification unit 24. The user terminal 30 is provided with a communicator 31 and a human machine interface (HMI) 32.

A parking lot in which the parking-lot managing apparatus 10 is installed is a so-called valet parking. In the parking lot, a user of the vehicle 20 gets out of the vehicle at a predetermined drop-off or alighting place located outside the parking lot. The ECU 22 of the vehicle 20 may have an automatic drive function and an automatic parking function. After the user gets out of the vehicle 20, the vehicle 20 may be automatically parked in a predetermined parking space in the parking lot while communicating with the parking-lot managing apparatus 10. When leaving, the vehicle 20 may be automatically moved from the parking space to a predetermined pick-up or boarding place located outside the parking lot while communicating with the parking-lot managing apparatus 10.

In this type of parking lot, there is a possibility to move a parked vehicle in case of unexpected accident, such as, for example, disaster. In this case, it is not realistic to communicate with each one of users of parked vehicles. On the other hand, for example, the user's lending a key of the vehicle 20 to a manager of the parking lot or the like possibly causes a security problem. Thus, in the electronic key system 1, a virtual key with a limited function may be issued by the server apparatus 40 when the vehicle 20 is parked in the parking lot in which the parking-lot managing apparatus 10 is installed.

Now, each of the components of the parking-lot managing apparatus 10 will be explained. The monitor 12 is configured to monitor a vehicle status or the like, in each of the parking lot, the drop-off place, and the pick-up place, for example, by using a camera, an optical sensor, or the like. The parking-lot database 13 is configured to store therein, for example, the number of parking spaces, a position (or coordinates) of each parking space, driving route information, or the like. The virtual key storage 16 may have, for example, a non-volatile memory or the like, and is configured to store therein the aforementioned virtual key. The key verification unit 17 is configured to verify the virtual key stored in the virtual key storage 16 (e.g., to determine whether or not the virtual key is normal, or perform similar actions). The entering instruction unit 14 and the leaving instruction unit 15 will be described later.

Each of the components of the vehicle 20 will be explained. The ECU 22 may have, for example, a vehicle surroundings monitoring function, a parking position search function, a driving route generation function, the automatic drive function, the automatic parking function, and the like. Those functions can be realized by the existing technologies/techniques, and an explanation of the details will be thus omitted. The virtual key storage 23 may have, for example, a non-volatile memory or the like, and is configured to store therein the aforementioned virtual key. The key verification unit 24 is configured to verify the virtual key stored in the virtual key storage 23 (or to verify the virtual key stored in the virtual key storage 16 if necessary).

The user terminal 30 may be a terminal owned by the user of the vehicle 20. The user can give an instruction associated with the parking of the vehicle 20 (e.g., a leaving instruction) or can display information associated with the parking space of the vehicle 20, via the HMI 32. The user terminal 30 may be an exclusive terminal, or may be a terminal realized by installing an exclusive application, for example, to a smartphone or the like.

(Operation of Parking-Lot Managing Apparatus)

Figure 2:
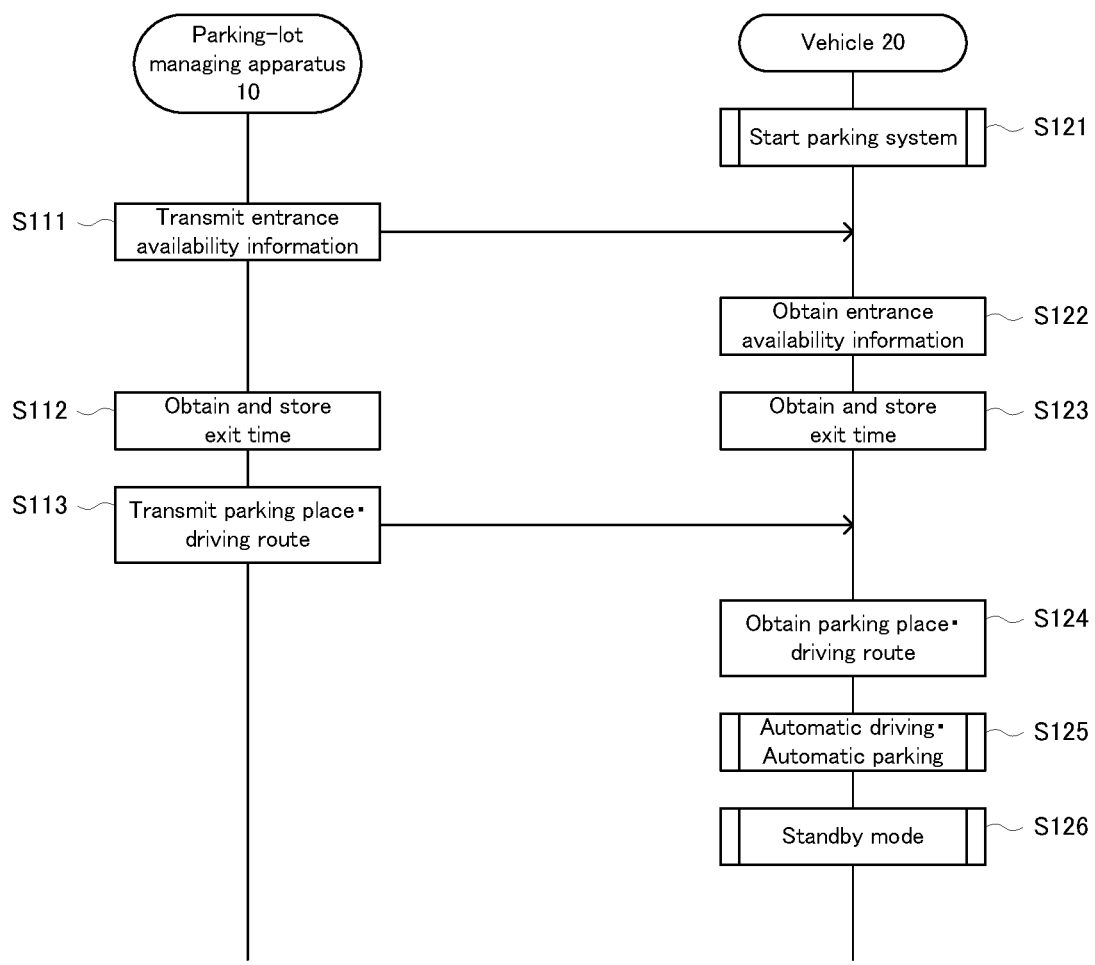
FIG. 2 is a flowchart illustrating an entering process according to the embodiment.
Figure 3:
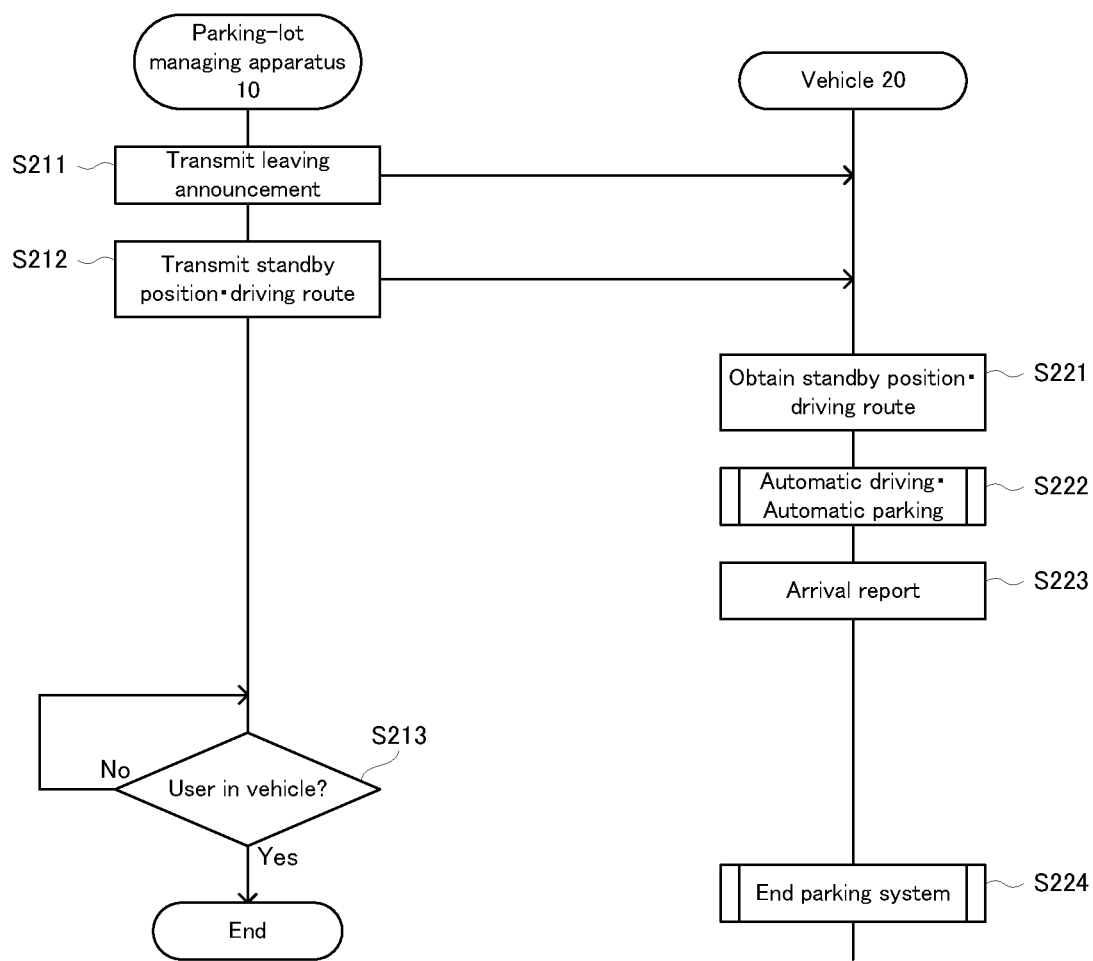
FIG. 3 is a flowchart illustrating a leaving process according to the embodiment.

Next, the operation of the parking-lot managing apparatus 10 will be explained with reference to FIG. 2 and FIG. 3. FIG. 2 is a flowchart illustrating an entering process according the embodiment. FIG. 3 is a flowchart illustrating a leaving process according the embodiment.

1. Entering Process

In FIG. 2, firstly, if a parking system is started by the user of the vehicle 20 in the predetermined drop-off place of the parking lot, the vehicle 20 and the parking-lot managing apparatus 10 are allowed to communicate with each other (step S121). Here, the parking system may be started by the user operating a not-illustrated predetermined switch or the like, which is mounted on the vehicle 20, or may be started via the user terminal 30. The parking system conceptually includes, for example, the vehicle surroundings monitoring function, the parking position search function, the driving route generation function, the automatic drive function, and the automatic parking function (refer to FIG. 2). If the parking system is started, those functions become effective.

After the communication with the vehicle 20 is allowed, the entering instruction unit 14 of the parking-lot managing apparatus 10 may determine whether or not the vehicle 20 can enter, on the basis of an output of the monitor 12 (e.g., information indicating a vehicle status in the parking lot, etc.). The entering instruction unit 14 then transmits a determination result to the vehicle 20, as entrance availability information (step S111). The ECU 22 of the vehicle 20 obtains the entrance availability information (step S122), and notifies the user of information corresponding to the entrance availability information (e.g., "available", "full", etc.). The user can know whether or not the parking lot is available by the entrance availability information that is transmitted to the vehicle 20.

If the entrance availability information indicates that the vehicle 20 cannot enter the parking lot (i.e., full), a subsequent procedure depends on the user's decision; for example, the vehicle 20 may be moved to use another parking lot, or the vehicle 20 may wait until being allowed to enter.

Here, the entering process illustrated in FIG. 2 will be explained in the assumption that the entrance availability information indicates that the vehicle 20 can enter the parking lot. After the step S122, a leaving time point set by the user is obtained (steps S112, S123).

At this time, if the user sets the leaving time point via a not-illustrated input device mounted on the vehicle 20, the ECU 22 of the vehicle 20 may obtain and store the set leaving time point, for example, in a memory or the like. The ECU 22 may further transmit a signal indicating the leaving time point, to the parking-lot managing apparatus 10, via the communicator 21. The entering instruction unit 14 of the parking-lot managing apparatus 10 that has received the signal may store the leaving time point indicated by the signal, in the parking-lot DB 13, in association with, e.g., specific information indicating the vehicle 20, information indicating a parking place of the vehicle 20, or the like. Alternatively, if the user sets the leaving time point via the HMI 32 of the user terminal 30, a signal indicating the leaving time point may be transmitted to the parking-lot managing apparatus 10 and the vehicle 20 via the communicator 31.

The entering instruction unit 14 of the parking-lot managing apparatus 10 then determines a parking place of the vehicle 20 and a driving route starting from the drop-off place to the parking place, with reference to, for example, the position of each parking space stored in the parking-lot database 13 and the driving route information, and transmits a signal indicating the determined parking place and the determined driving route, to the vehicle 20 (step S113).

The ECU 22 of the vehicle 20 obtains the signal indicating the parking place and the driving route (step S124). After the user gets out of the vehicle 20, the ECU 22 may generate a driving route on which the vehicle 20 actually should run, by using the driving route generation function, for example, in view of an obstacle or the like in the surroundings of the vehicle 20, which is detected by the vehicle surroundings monitoring function, with reference to the driving route indicated by the obtained signal. The ECU 22 may then control, for example, an engine, a motor, various actuators or the like, so that the vehicle 20 runs along the generated driving route, by using the automatic drive function. After the vehicle 20 moves to near the parking place indicated by the obtained signal, the ECU 22 detects the parking place (e.g., a white line indicating the parking space, or the like) by using the parking position search function, and parks the vehicle 20 in the parking place by using the automatic parking function (step S125).

The ECU 22 then sets the vehicle 20 in a standby mode (step S126). The "standby mode" herein is, for example, a state in which energy consumption is reduced or suppressed, wherein the communication is allowed between the vehicle 20 and the parking-lot managing apparatus 10.

The step S112 and the step S123, i.e., obtaining and storing the leaving time point, may be omitted. In other words, the user may not set the leaving time point when entering. In this case, the leaving time point may be set via the user terminal 30 after the completion of the parking of the vehicle 20, or a signal indicating a leaving instruction may be transmitted to the parking-lot managing apparatus 10 from the user terminal 30 in such timing that the user desires the vehicle 20 to leave.

2. Leaving Process

In FIG. 3, the leaving instruction unit 15 of the parking-lot managing apparatus 10 transmits a leaving announcement, to the vehicle 20 via the communicator 11, a predetermined time before the set leaving time point, or when receiving the signal indicating the leaving instruction of the vehicle 20 (step S211). The ECU 22 of the vehicle 20 that has received the leaving announcement may release or cancel the standby mode. The "predetermined time before the leaving time point" may be determined, for example, in view of a time required to move to the predetermined pick-up place from the parking place of the vehicle 20, or the like.

The leaving instruction unit 15 then determines a standby position of the vehicle 20 in the pick-up place and a driving route starting from the parking place to the standby position, with reference to, for example, the driving route information or the like stored in the parking-lot database 13, and transmits a signal indicating the determined standby position and the determined driving route, to the vehicle 20 (step S212).

The ECU 22 of the vehicle 20 obtains the signal indicating the standby position and the driving route (step S221). The ECU 22 may then generate a driving route on which the vehicle 20 actually should run, by using the driving route generation function, for example, in view of an obstacle or the like in the surroundings of the vehicle 20, which is detected by the vehicle surroundings monitoring function, with reference to the driving route indicated by the obtained signal. The ECU 22 may then control, for example, the engine, the motor, the various actuators or the like, so that the vehicle 20 runs along the generated driving route, by using the automatic drive function. After the vehicle 20 moves to near the standby position indicated by the obtained signal, the ECU 22 detects the standby position by using the parking position search function, and parks the vehicle 20 in the standby position by using the automatic parking function (step S222).

The ECU 22 then transmits an arrival report to the parking-lot managing apparatus 10 via the communicator 21 (step S223). At this time, the ECU 22 may keep the vehicle 20 travelable. Then, for example, when the user gets on the vehicle 20, the parking system is ended (step S224). The parking system may be ended by the user operating a not-illustrated predetermined switch or the like, which is mounted on the vehicle 20, or may be started via the user terminal 30.

The leaving instruction unit 15 of the parking-lot managing apparatus 10 that has received the arrival report determines whether or not the user is in the vehicle 20 (step S213). Here, whether or not the user is in the vehicle 20 may be determined, for example, by detecting whether or not a signal indicating the user's ride is transmitted from the vehicle 20, whether or not the parking system is turned off, or similar situations.

In the determination in the step S213, if it is determined that the user is in the vehicle 20 (the step S213: Yes), the leaving process illustrated in FIG. 3 is ended. On the other hand, in the determination in the step S213, if it is determined that the user is not in the vehicle 20 (the step S213: No), the leaving instruction unit 15 performs the determination in the step S213 again after a lapse of a first predetermined period (e.g., several ten milliseconds to several hundred milliseconds).

(Virtual Key)

Figure 4:
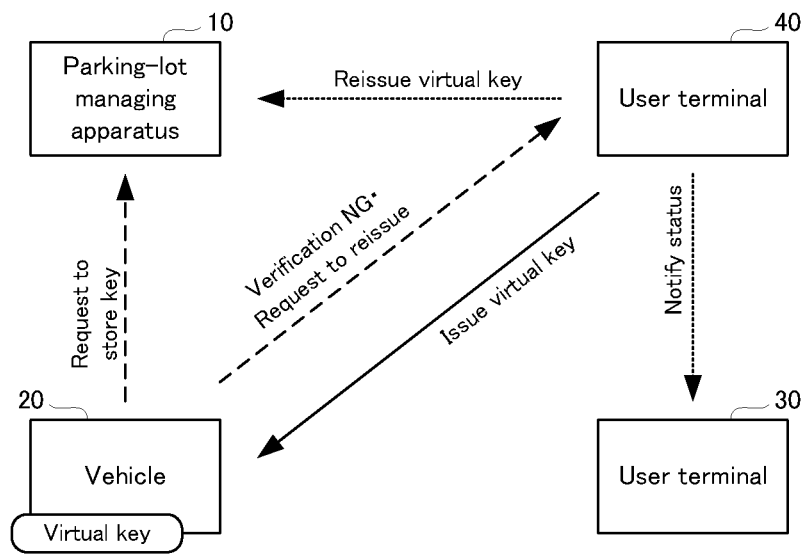
FIG. 4 is a diagram illustrating an example of a data flow in issuing a virtual key according to the embodiment.
Figure 5:
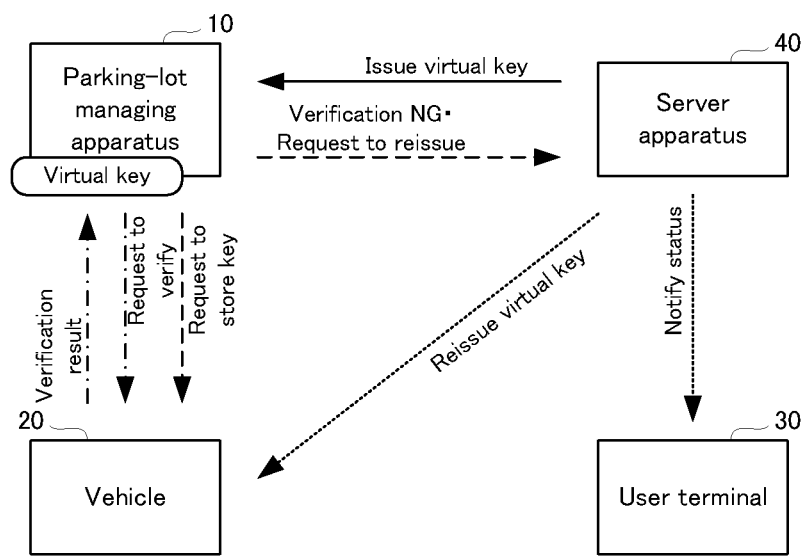
FIG. 5 is a diagram illustrating another example of the data flow in issuing the virtual key according to the embodiment.
Figure 6:
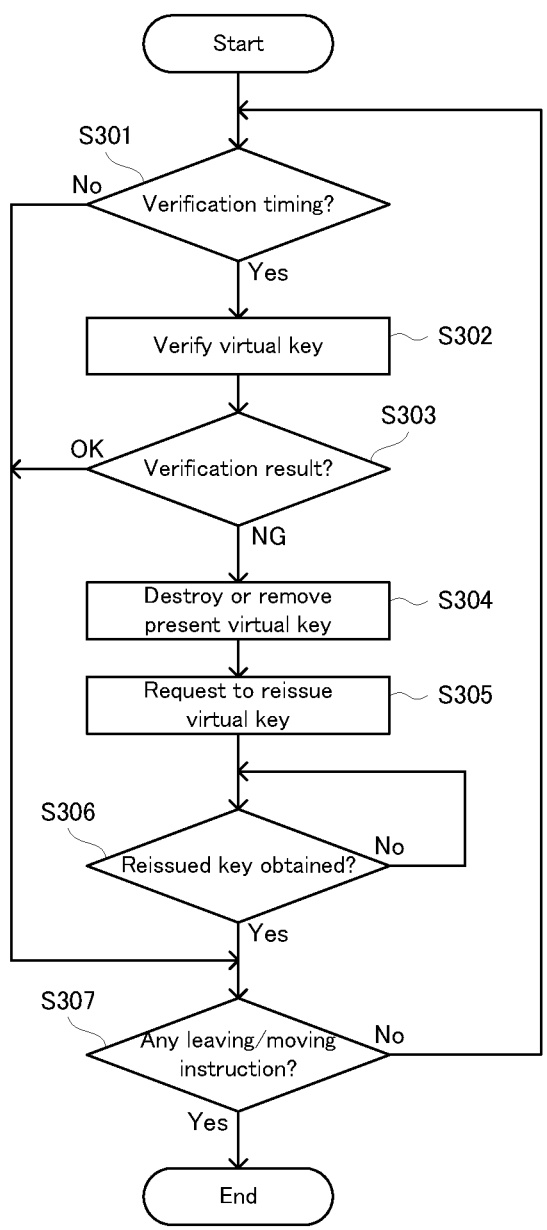
FIG. 6 is a flowchart illustrating a verification process according to the embodiment.

Next, the virtual key will be explained with reference to FIG. 4 to FIG. 6. FIG. 4 is a diagram illustrating an example of a data flow in issuing the virtual key according to the embodiment. FIG. 5 is a diagram illustrating another example of the data flow in issuing the virtual key according to the embodiment. FIG. 6 is a flowchart illustrating a verification process according the embodiment.

1. Timing of Issuing Virtual Key

The virtual key may be issued by the server apparatus 40 in parallel with or before or after the step S121 described above (refer to FIG. 2). The server apparatus 40 may issue the virtual key to the vehicle 20 as illustrated in FIG. 4, or may issue the virtual key to the parking-lot managing apparatus 10 as illustrated in FIG. 5. The vehicle 20 or the parking-lot managing apparatus 10 may store the virtual key in the virtual key storage 23 or 16 (refer to FIG. 1), for example, in parallel with the step S113 or the step S124 described above (refer to FIG. 2).

After the vehicle 20 is set in the standby mode in the step S126 described above (refer to FIG. 2) (i.e., after the vehicle 20 is parked in the predetermined parking space), the key verification unit 24 of the vehicle 20 (and moreover, the key verification unit 17) may perform a verification process associated with the virtual key. The verification process may be regularly repeated while the vehicle 20 is parked. The verification process will be described later.

If the virtual key is stored in the virtual key storage 23 of the vehicle 20, the virtual key may be deleted or may be returned to the server apparatus 40 when the parking system is ended by the step S224 described above (refer to FIG. 3). If the virtual key is stored in the virtual key storage 16 of the parking-lot managing apparatus 10, the virtual key may be deleted or may be returned to the server apparatus 40 when it is determined in the step S213 described above that the user is in the vehicle 20.

2. Verification Process

The verification process associated with the virtual key will be explained. Firstly, an outline of the verification process in the electronic key system 1 will be explained for the following two cases; namely, when the virtual key is stored on the vehicle 20 side and when the virtual key is stored on the parking-lot managing apparatus 10 side. Then, a flowchart associated with the verification process performed by the key verification units 17 and 24.

(1) When Virtual Kay is Stored on Vehicle 20 Side

As illustrated in FIG. 4, when the virtual key is stored on the virtual key storage 23 of the vehicle 20, the key verification unit 24 may perform the verification process associated with the virtual key in predetermined timing. Specifically, the key verification unit 24 is configured to determine whether or not the virtual key stored in the virtual key storage 23 can be accessed (i.e., whether or not the virtual key storage 23 has a failure), and whether or not the virtual key is normal.

The determination of whether or not the virtual key is normal may be performed, for example, by confirming whether or not security associated with the vehicle 20 (e.g., an immobilizer, a door lock, a shift lock, a steering lock, etc.) can be canceled or released by the virtual key. If the security associated with the vehicle 20 can be canceled by the virtual key, it may be determined that the virtual key is normal. On the other hand, if the security associated with the vehicle 20 cannot be canceled by the virtual key, it may be determined that the virtual key is not normal (i.e., is abnormal).

When the virtual key is used to confirm whether or not the security associated with the vehicle 20 can be canceled, for example, a lock mechanism or the like is not necessarily actually canceled or released. For example, information associated with the virtual key (i.e. a key code) may be used to confirm whether or not a program for canceling the security is performed normally.

If it is determined that the virtual key is normal, the key verification unit 24 may temporarily end the verification process and may perform the verification process again in the next timing to perform the verification process. On the other hand, if it is determined that the virtual key cannot be accessed, or if it is determined that the virtual key is not normal (i.e., is abnormal), the key verification unit 24 may request the server apparatus 40 to reissue the virtual key. At this time, the key verification unit 24 may request the parking-lot managing apparatus 10 to store the virtual key.

The server apparatus 40 that is requested to reissue the virtual key may reissue the virtual key to the parking-lot managing apparatus 10. Here, the virtual key to be reissued may have a key code that is different from that of the virtual key stored in the virtual key storage 23. For example, an encoding method, a security level and the like associated with the virtual key to be reissued may be changed from those associated with the original virtual key (i.e., the virtual key that is determined to be abnormal). The server apparatus 40 may further transmit a notification indicating that the virtual key is reissued, to the user terminal 30.

(2) When Virtual Kay is Stored on Parking-Lot Managing Apparatus 10 Side

As illustrated in FIG. 5, when the virtual key is stored on the virtual key storage 16 of the parking-lot managing apparatus 10, the key verification unit 17 may request the key verification unit 24 of the vehicle 20 to perform the verification process associated with the virtual key, in predetermined timing. At this time, the key verification unit 17 may transmit the virtual key stored in the virtual key storage 16 (or a duplicate of the virtual key) to the key verification unit 24.

The key verification unit 24 that has received the request for the verification process may determine whether or not the virtual key is normal. If it is determined that the virtual key is normal, the key verification unit 24 may transmit a signal indicating the determination result, to the key verification unit 17. At this time, the key verification unit 24 may return the virtual key to the parking-lot managing apparatus 10. In the case of the duplicate of the virtual key, the key verification unit 24 may delete the duplicate. The key verification unit 17 that has received the signal indicating the determination result, which is the virtual key is normal, may then request the key verification unit 24 to perform verification process again in the next timing to perform the verification process.

If it is determined that the virtual key is not normal (i.e., is abnormal), the key verification unit 24 may transmit a signal indicating the determination result to the key verification unit 17. The key verification unit 17 that has received the signal indicating the determination result, which is the virtual key is abnormal, may request the server apparatus 40 to reissue the virtual key. At this time, the key verification unit 17 may request the vehicle 20 to store the virtual key.

If the key verification unit 17 cannot access the virtual key stored in the virtual key storage 16 in the predetermined timing, i.e., if the virtual key storage 16 has a failure, the key verification unit 17 may request the server apparatus 40 to reissue the virtual key without requesting the key verification unit 24 to perform the verification process associated with the virtual key.

The server apparatus 40 that is requested to reissue the virtual key may reissue the virtual key to the vehicle 20. Here, the virtual key to be reissued may have a key code that is different from that of the virtual key stored in the virtual key storage 16. The server apparatus 40 may further transmit a notification indicating that the virtual key is reissued, to the user terminal 30.

(3) Flow of Verification Process

Next, the verification process performed by the key verification units 17 and 24 will be explained with reference to a flowchart in FIG. 6.

In FIG. 6, firstly, it is determined whether or not it is a time to verify the virtual key (step S301). When the virtual key is stored on the vehicle 20 side, the step S301 may be performed by the key verification unit 24. On the other hand, when the virtual key is stored on the parking-lot managing apparatus 10 side, the step S301 may be performed by the key verification unit 17.

In the determination in the step S301, if it is determined that it is not the time to verify the virtual key (the step S301: No), the process illustrated in FIG. 6 may be ended. Then, the step S301 may be performed again after a lapse of a second predetermined period (e.g., several ten milliseconds to several hundred milliseconds).

On the other hand, in the determination in the step S301, if it is determined that it is the time to verify the virtual key (the step S301: Yes), the virtual key is verified (step S302). Then, a result of the verification of the virtual key is determined (step S303). When the virtual key is stored on the vehicle 20 side, the step S303 may be performed by the key verification unit 24. On the other hand, when the virtual key is stored on the parking-lot managing apparatus 10 side, the step S303 may be performed by the key verification unit 17.

In the determination in the step S303, if it is determined that the virtual key is normal (the step S303: OK), a step S307 described later may be performed. On the other hand, in the determination in the step S303, if it is determined that the virtual key is abnormal (the step S303: NG), the present virtual key is destroyed or removed (step S304). In parallel with the step S304, the server apparatus 40 is requested to reissue the virtual key (step S305).

When the virtual key is stored on the vehicle 20 side, the step S304 and the step S305 may be performed by the key verification unit 24. On the other hand, when the virtual key is stored on the parking-lot managing apparatus 10 side, the step S304 and the step S305 may be performed by the key verification unit 17.

It is then determined whether or not the virtual key reissued by the server apparatus 40 is obtained (step S306). When the virtual key is stored on the vehicle 20 side, the step S306 may be performed by the key verification unit 17. On the other hand, when the virtual key is stored on the parking-lot managing apparatus 10 side, the step S306 may be performed by the key verification unit 24.

In the determination in the step S306, if it is determined that the reissued virtual key is not obtained yet (the step S306: No), the step S306 may be performed again after a lapse of a third predetermined period (e.g., several ten milliseconds to several hundred milliseconds).

On the other hand, in the determination in the step S306, if it is determined that the reissued virtual key is obtained (the step S306: Yes), it is determined whether or not the leaving instruction or a moving instruction is given to the vehicle 20 (step S307).

When the virtual key or the reissued virtual key is stored on the vehicle 20 side, the step S307 may be performed by the key verification unit 24. In this case, the key verification unit 24 may perform the step S307 by confirming whether or not the leaving announcement is transmitted to the vehicle 20 from the leaving instruction unit 15 (refer to FIG. 3). When the virtual key or the reissued virtual key is stored on the parking-lot managing apparatus 10 side, the step S307 may be performed by the key verification unit 17. In this case, the key verification unit 17 may perform the step S307 by confirming whether or not the leaving announcement is transmitted to the vehicle 20 from the leaving instruction unit 15.

In the determination in the step S307, if it is determined that the leaving instruction or the moving instruction is given (the step S307: Yes), the process illustrated in FIG. 6 may be ended. On the other hand, in the determination in the step S307, if it is determined that the leaving instruction or the moving instruction is not given (the step S307: No), the step S301 may be performed again.

(Technical Effect)

In the electronic key system 1, the virtual key may be reissued by the server apparatus 40 if it is determined that the virtual key stored in the virtual key storage 16 or 23 is abnormal. Therefore, according to the electronic key system 1, the virtual key can be normalized if an abnormality occurs in the virtual key.

In the electronic key system 1, the verification process associated with the virtual key may be performed while the vehicle 20 is parked, and the virtual key may be reissued if it is determined that the virtual key is abnormal in the verification process. If the determination of whether or not the virtual key is abnormal is performed when the virtual key is used (e.g., when an unexpected accident occurs and a person other than the user tries to move the vehicle 20 or in similar cases) and if the virtual key is abnormal, it may take a relatively long time to move the vehicle 20 due to the reissue of the virtual key or the like. In the electronic key system 1, however, if an abnormality occurs in the virtual key, the virtual key is reissued while the vehicle 20 is parked (i.e., before the virtual key is used). It is thus possible to immediately move the vehicle 20 if necessary.

In the electronic key system 1, if the virtual key is reissued, the virtual key to be reissued may have a key code that is different from that of the present virtual key. It is thus possible to realize a system with a higher level of security and reliability than a system according to a comparative example in which the same virtual key as the original virtual key is reissued.

In the electronic key system 1, the virtual key is reissued only if it is determined that the virtual key is abnormal. It is thus possible to reduce a communication load of the communication among the parking-lot managing apparatus 10, the vehicle 20, the user terminal 30, and the server apparatus 40, and a processing load of the server apparatus 40, in comparison with a system according to a comparative example in which the virtual key is regularly updated in a preventive manner.

First Modified Example

The parking-lot managing apparatus 10 may be provided with a plurality of virtual key storages 16. In the same manner, the vehicle 20 may be provided with a plurality of virtual key storages 23.

For example, an explanation will be give to an example in which the vehicle 20 is provided with a first storage and a second storage as the virtual key storages 23. If a virtual key stored in the first storage is determined to be abnormal and if the server apparatus 40 is requested to reissue the virtual key, the server apparatus 40 may reissue the virtual key not to the parking-lot managing apparatus 10 but to the vehicle 20. In this case, the reissued virtual key may be stored in the second storage.

Second Modified Example

If the server apparatus 40 is requested to reissue the virtual key, the server apparatus 40 may transmit a notification indicating that permission of the reissue of the virtual key is asked for, to the user terminal 30. Then, the server apparatus 40 may be configured to reissue the virtual key only when receiving a notification indicating the permission of the reissue from the user terminal 30.

Other Modified Examples (1) The user terminal 30 may have a function of issuing the virtual key and a function of reissuing the virtual key.
(2) When the virtual key is stored in the virtual key storage 16, the key verification unit 17 (i) may perform a process of transmitting/receiving a predetermined signal associated with the virtual key to/from the virtual key storage 16, and (ii) may determine that the virtual key is normal on condition that the process is ended normally a predetermined number of times. In the same manner, when the virtual key is stored in the virtual key storage 23, the key verification unit 24 (i) may perform a process of transmitting/receiving a predetermined signal associated with the virtual key to/from the virtual key storage 23, and (ii) may determine that the virtual key is normal on condition that the process is ended normally a predetermined number of times.

By virtue of such a configuration, it is possible to determine whether or not the virtual key is normal, only by the transmission/reception between the virtual key storage 16 or 23 and the key verification unit 17 or 24. It is thus possible to prevent an unexpected operation of the electronic key system 1 in performing the aforementioned verification process.

(3) The server apparatus 40 that is requested to reissue the virtual key may perform a predetermined process (e.g., an authentication process, etc.) with the key verification unit 17 or 24, and may reissue the virtual key on condition that the process is ended normally.

Various aspects of embodiments of the present disclosure derived from the embodiment and the modified examples explained above will be explained hereinafter.

An electronic key system according to an aspect of embodiments of the present disclosure is provided with: an electronic key issuing apparatus configured to issue an electronic key associated with a moving body; a determinator configured to determine whether or not an electronic key with a first key code as the electronic key, which is issued by the electronic key issuing apparatus, is normal; and a requester configured to request the electronic key issuing apparatus to reissue the electronic key on condition that it is determined by the determinator that the electronic key with the first key code is not normal, wherein the electronic key issuing apparatus is configured to issue an electronic key with a second key code, which is different from the first key code, as the electronic key, on condition that the electronic key issuing apparatus is requested to reissue the electronic key.

In the electronic key system, if it is determined that the electronic key is not normal (i.e., is abnormal), the electronic key may be reissued by the electronic key issuing apparatus. Therefore, according to the electronic key system, the electronic key can be normalized if an abnormality occurs in the electronic key. In the aforementioned embodiment, the "server apparatus 40" corresponds to an example of the "electronic key issuing apparatus". The "key verification unit 17 and/or 24" corresponds to an example of the "determinator" and the "requester".

In one aspect of the electronic key system described above, the electronic key system may be provided with a first storage and a second storage, both of which are configured to store therein the electronic key, and the electronic key issuing apparatus may be configured to issue the electronic key with the second key code to one of the first storage and the second storage on condition that said electronic key issuing apparatus is requested to reissue the electronic key when the electronic key with the first key code is stored in the other of the first storage and the second storage.

According to this aspect, when the electronic key is reissued, a storage place of the reissued electronic key may be changed. It is thus possible to prevent that an abnormality occurs again in the reissued electronic key. In this aspect, the first storage may be provided in the moving body, and the second storage may be provided in a facility in which the moving body is stopped.

An electronic key managing apparatus according to an aspect of embodiments of the present disclosure is provided with: a storage configured to store therein an electronic key associated with a moving body; a determinator configured to determine whether or not an electronic key with a first key code as the electronic key is normal; and a requester configured to request an electronic key issuing apparatus, which is configured to issue the electronic key, to reissue the electronic key on condition that it is determined by the determinator that the electronic key with the first key code is not normal.

According to the electronic key managing apparatus, as in the aforementioned electronic key system, the electronic key can be normalized if an abnormality occurs in the electronic key. Even the electronic key managing apparatus can adopt the same various aspects as those of the aforementioned electronic key system. In the aforementioned embodiment, the "parking-lot managing apparatus 10" corresponds to an example of the "electronic key managing apparatus", and the "vehicle 20" corresponds to another example of the "electronic key managing apparatus".

In one aspect of the electronic key managing apparatus described above, the requester may be configured to request the electronic key issuing apparatus, which is configured to issue the electronic key, to reissue an electronic key with a second key code, which is different from the first key code, as the electronic key, on condition that it is determined by the determinator that the electronic key with the first key code is not normal.

According to this aspect, it is possible to realize an apparatus with a higher level of security and reliability than an apparatus according to a comparative example in which the electronic key with the same key code as the original key code is reissued.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. An electronic key system comprising:
an electronic key issuing apparatus configured to issue an electronic key associated with a moving body, wherein the electronic key issued by said electronic key issuing apparatus has a limited function for operating the moving body;
a determinator configured to determine whether or not an electronic key with a first key code as the electronic key, which is issued by said electronic key issuing apparatus, works normally; and
a requester configured to request said electronic key issuing apparatus to reissue the electronic key on a condition that it is determined by said determinator that the electronic key with the first key code does not work normally, wherein
said electronic key issuing apparatus is configured to issue an electronic key with a second key code, which is different from the first key code, as the electronic key, to at least one of the moving body and a facility in which the moving body is stopped on a condition that said electronic key issuing apparatus is requested to reissue the electronic key, wherein
the moving body is automatically parked in a predetermined parking space in the facility by communicating with a parking-lot managing apparatus included in the facility; and
said electronic key issuing apparatus is configured to issue an electronic key with the second key code, as the electronic key, to at least one of the moving body and the facility while the moving body is parked in the predetermined parking space on a condition that said electronic key issuing apparatus is requested to reissue the electronic key.

2. The electronic key system according to claim 1, wherein
said electronic key system comprises a first storage and a second storage, both of which are configured to store therein the electronic key, and
said electronic key issuing apparatus is configured to issue the electronic key with the second key code to one of the first storage and the second storage, provided in the at least one of the moving body and the facility, on a condition that said electronic key issuing apparatus is requested to reissue the electronic key when the electronic key with the first key code is stored in the other of the first storage and the second storage.

3. The electronic key system according to claim 2, wherein
the first storage is provided in the moving body, and
the second storage is provided in the facility in which the moving body is stopped.

4. An electronic key managing apparatus comprising:
a storage configured to store therein an electronic key associated with a moving body;
a determinator configured to determine whether or not an electronic key with a first key code as the electronic key works normally; and
a requester configured to request an electronic key issuing apparatus, which is configured to issue the electronic key having a limited function for operating the moving body, to reissue the electronic key to at least one of the moving body and a facility in which the moving body is stopped on a condition that it is determined by said determinator that the electronic key with the first key code does not work normally, wherein
the moving body is automatically parked in a predetermined parking space in the facility by communicating with a parking-lot managing apparatus included in the facility; and
said electronic key issuing apparatus is configured to issue an electronic key with a second key code, as the electronic key, to at least one of the moving body and the facility while the moving body is parked in the predetermined parking space on a condition that said electronic key issuing apparatus is requested to reissue the electronic key.

5. The electronic key managing apparatus according to claim 4, wherein said requester is configured to request the electronic key issuing apparatus, which is configured to issue the electronic key, to reissue an electronic key with the second key code, which is different from the first key code, as the electronic key, on a condition that it is determined by said determinator that the electronic key with the first key code does not work normally.

6. A method including:
issuing, by an electronic key issuing apparatus, an electronic key associated with a moving body, wherein the electronic key issued by said electronic key issuing apparatus has a limited function for operating the moving body;
determining whether or not an electronic key with a first key code as the electronic key, which is issued by the electronic key issuing apparatus, works normally;
requesting the electronic key issuing apparatus to reissue the electronic key on a condition that it is determined that the electronic key with the first key code does not work normally; and
issuing, by the electronic key issuing apparatus, an electronic key with a second key code, which is different from the first key code, as the electronic key, to at least one of the moving body and a facility in which the moving body is stopped on condition that said electronic key issuing apparatus is requested to reissue the electronic key, wherein the method further includes
automatically parking the moving body in a predetermined parking space in the facility by communicating with a parking-lot managing apparatus included in the facility; and
issuing, by the electronic key issuing apparatus, an electronic key with the second key code, as the electronic key, to at least one of the moving body and the facility while the moving body is parked in the predetermined parking space on a condition that said electronic key issuing apparatus is requested to reissue the electronic key.

7. A method for managing an electronic key associated with a moving body including:
determining whether or not an electronic key with a first key code as the electronic key works normally; and
requesting an electronic key issuing apparatus, which is configured to issue the electronic key having a limited function for operating the moving body, to reissue the electronic key to at least one of the moving body and a facility in which the moving body is stopped on condition that it is determined that the electronic key with the first key code does not work normally, wherein the method further includes
automatically parking the moving body in a predetermined parking space in the facility by communicating with a parking-lot managing apparatus included in the facility; and
issuing, by the electronic key issuing apparatus, an electronic key with a second key code, as the electronic key, to at least one of the moving body and the facility while the moving body is parked in the predetermined parking space on a condition that said electronic key issuing apparatus is requested to reissue the electronic key.

8. The electronic key system according to claim 1, wherein the moving body is a vehicle.

9. The electronic key system according to claim 1, wherein said determinator is configured to determine that the electronic key with the first key code works normally, if security associated with the moving body is canceled by the electronic key with the first key code and to determine that the electronic key with the first key code does not work normally, if security associated with the moving body is not canceled by the electronic key with the first key code.

* * * * *